Dec. 26, 1950 J. F. ATTWELL 2,535,254
GARDEN TRACTOR

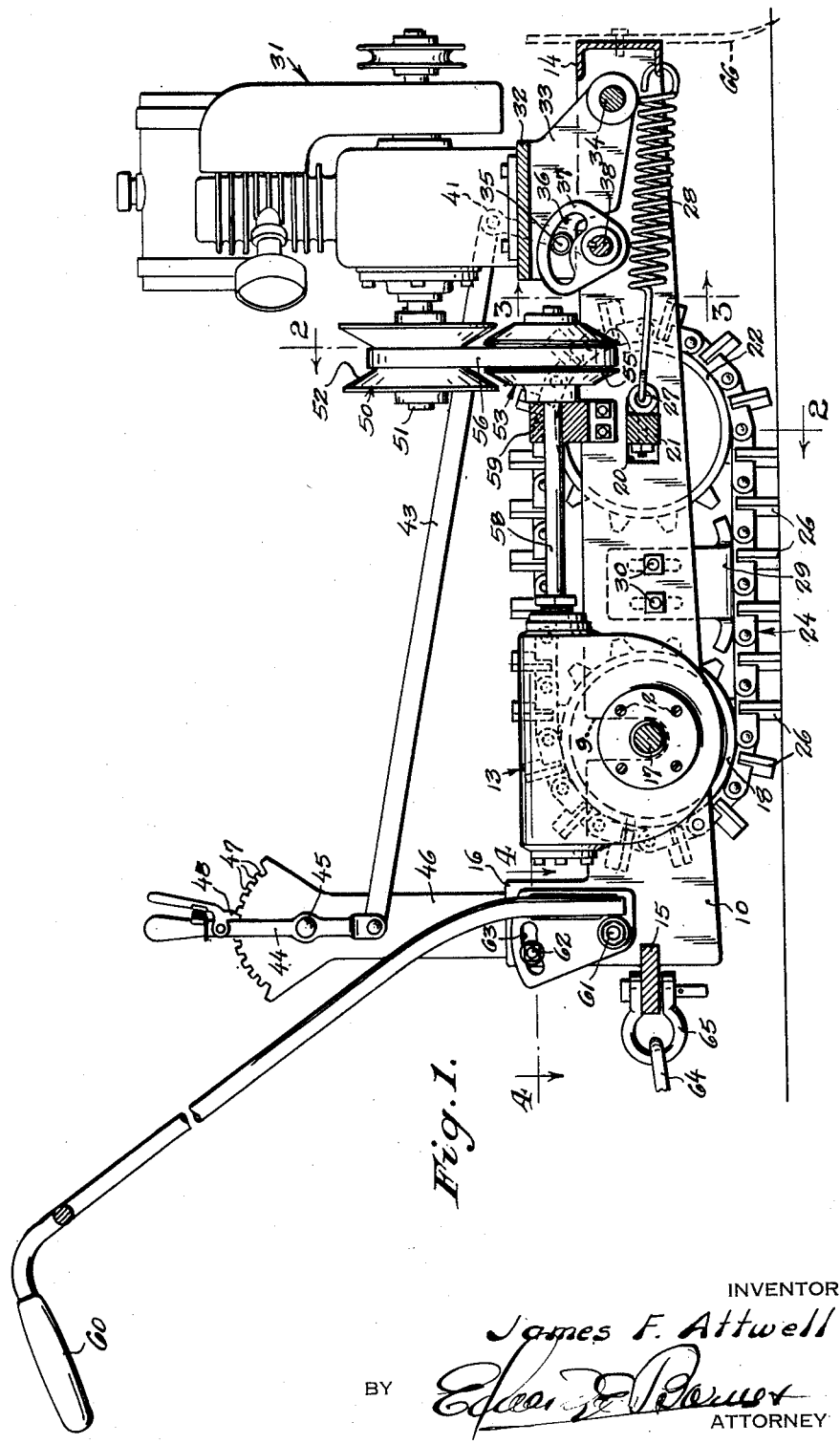

Filed July 21, 1947 2 Sheets-Sheet 2

INVENTOR.
James F. Attwell
BY
ATTORNEYS.

Patented Dec. 26, 1950

2,535,254

UNITED STATES PATENT OFFICE 2,535,254

GARDEN TRACTOR

James F. Attwell, Seattle, Wash., assignor to Windolph Tractor Company, Portland, Oreg., a copartnership Application July 21, 1947, Serial No. 762,433

4 Claims. (Cl. 180—9.1)

This invention relates to garden tractors, and for its general objects aims to provide a perfected crawler-type tractor of this nature having unusually simple construction, which may be produced at a relatively inexpensive figure, which is highly flexible in use, and which embodies advanced features enabling the machine to be controlled with unusual ease.

With these and other more particular objects and advantages in view, and which will appear and be understood in the course of the following description and claims, the invention consists in the novel construction and in the adaptation and combination of parts hereinafter described and claimed.

In the accompanying drawing:

Figure 1 is a longitudinal vertical sectional view illustrating a garden tractor produced in accordance with the now-preferred embodiment of the present invention.

Figure 3:
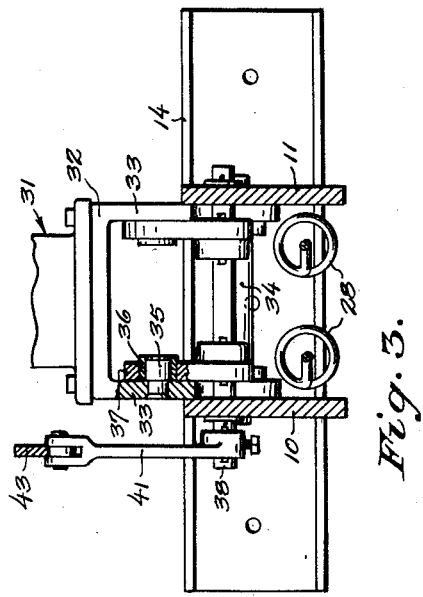
Fig. 3 is a fragmentary transverse vertical sectional view on line 3—3 of Fig. 1.
Figure 4:
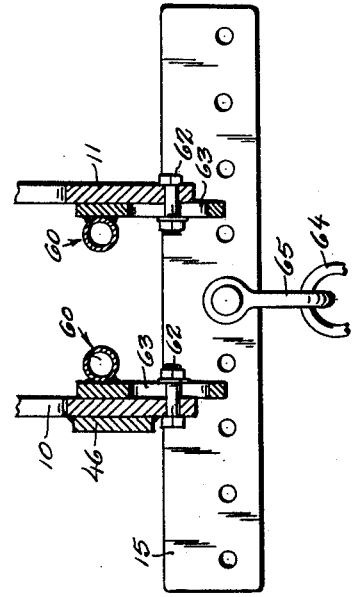
Fig. 4 is a fragmentary horizontal sectional view on line 4—4 of Fig. 1.
Figure 2:
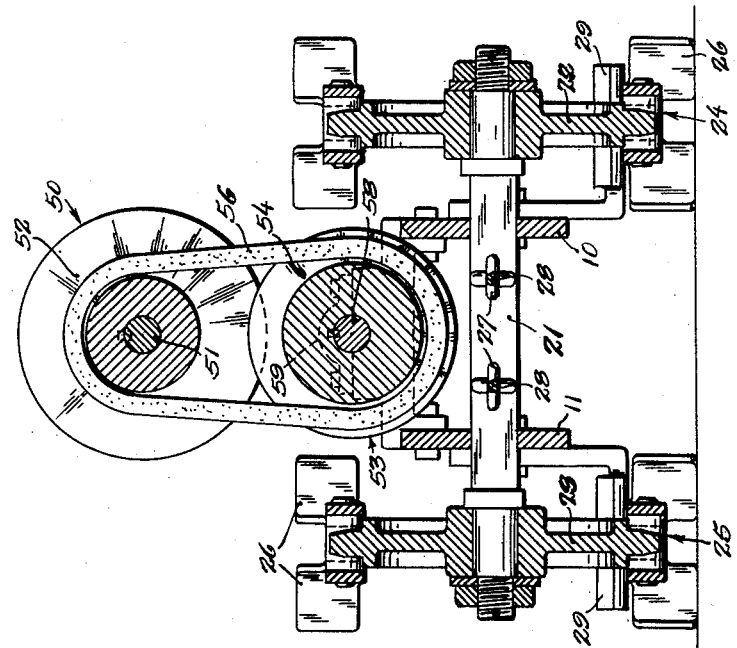
Fig. 2 is a transverse vertical sectional view thereof taken to an enlarged scale on line 2—2 of Fig. 1.

According to the present invention there is provided a frame comprised of longitudinal stringers denoted by the numerals 10 and 11 and securely bolted, as at 12, to lie one at one side and the other at the other side of a gear box 13 disposed to occupy a position well toward the rear end of the frame, these stringers being joined at the forward end of the frame by a transverse channel member 14 and at the rear end of the frame by a cross-bar 15, the connection in each of the latter instances being a permanent weld joint. The two stringers are each by preference formed from flat sheet steel placed on edge and presenting an upstanding ear 16 at the rear extremity. Each stringer has cut into the upper edge thereof a re-entrant opening 9 (shown dotted in Fig. 1) to accommodate a transverse drive axle 17 projecting from opposite sides of the gear box, and carried upon the exposed ends of this axle are driver sprocket wheels 18—19. Also cut in the stringers to lie in forwardly spaced relation from the gear box are horizontal slots 20, and received for fore-and-aft slide adjustment in these slots is a non-rotary transverse shaft 21 serving as the vehicle's front axle and having its ends prolonged outwardly beyond the frame to form journal mountings for idler sprocket wheels 22—23. Endless crawler chains 24 and 25, each carrying multiple tractor lugs 26, pass around the related pairs of live and idler sprocket wheels 18—22 and 19—23, and to automatically take up slack in these chains the shaft 21 is fitted centrally of its length with an eye-bolt 27 to which is attached a heavy extension spring 28 anchored by its other end to the front channel 14. Designated by 29 are pressure shoes, one at each side of the frame, bolted as at 30 to the latter and bearing upon the lower run of the endless chains to maintain an effective purchase as the chain lugs dig into the ground.

The engine for the vehicle is preferably a gas-powered unit denoted by 31 and which is mounted at the forward end of the vehicle upon a stand 32, the stand presenting depending legs 33 which are journaled for pivotal movement upon a frame-carried transverse shaft 34 and also presenting, placed to lie in rearwardly offset parallel relation to this shaft, a pair of transversely aligned pins 35 each carrying a roller. The rollers work in cam-slots 36 of respective quadrant arms 37 fixedly secured upon a transverse shaft 38, and this shaft is journaled in the frame and extends by one end laterally beyond the latter. A crank arm 41 is made fast to the shaft's projecting end, and this arm is linked by a bar 43 with a hand-operated lever 44 fulcrumed as at 45 to an upstanding bracket 46. There is formed in the bracket concentric with the fulcrum of the lever a series of notches 47, and functional to these notches is a locking dog 48.

Denoted 50 and keyed upon an exposed end of the engine's power shaft 51 is a driving pulley presenting a rather deep V-groove 52, and situated below in closely associated but normally separated relation thereto is a driven pulley 53 providing a comparatively shallower central V-groove 54 and having the two end faces 55 sloped in reverse correspondence with the slope of the groove 52. A drive belt 56, received about the two pulleys, engages in the V-grooves thereof, and while normally the drive is transferred through this belt from the one to the other pulley, the permitted vertical movement of the engine enabling the latter to be shifted from the position in which it is shown in Fig. 1 into a lowered position bringing the two pulleys into engagement acts to free the belt from its driving grip upon the lower pulley and causes the driving energy to be then transmitted through friction directly from the upper pulley to the sloping flanks 55 of the lower pulley, reversing the directional travel of the lower pulley. This lower pulley is keyed or otherwise firmly secured upon the forward end of a longitudinal shaft 58 journaled in a frame-carried bearing 59 and extending by its tail end into the gear box 13, and driven off said tail end are intermeshing worm and worm-wheel gears (not shown) which transmit the power to the drive axle 17.

A plow-tail handle 60, pivoted as at 61 to the frame, is made adjustable for vertical height by a nutted bolt 62 working in a slot 63. To indicate examples of the usage of the vehicle, a drawbar 64 which may be attached to a plow, harrow or other gardening implement is shown attached by a clevis 65 to the cross-bar 15 of the vehicle's frame, and there is also shown the manner in which a bull-dozing blade 66, represented by dotted lines, may be attached to the channel member 14.

In operating the vehicle, it becomes a comparatively easy matter to negotiate a turn, the operator simply lifting up on the back end to reduce the tread contact and then hitching the elevated end either to the right or to the left, as the case may be. Inasmuch as the vehicle's weight is so distributed as to bring the weight center in the approximate vertical plane of the front axle 21 the energy required for lifting the tail end is reduced to a minimum. To disengage the engine from the drive axle of the vehicle, the operator positions the control lever such as will bring the two pulleys into sufficiently close proximity to free the lower loop of the belt 56 from gripping contact with the V-groove 54 without, however, bringing the two pulleys into friction-driving engagement. Elevating the motor, and which is performed by pressing forwardly upon the handle end of the control lever 44, causes the belt to engage and the vehicle is then in forward drive. Drawing back upon the control handle lowers the motor to effectuate a friction grip between the two pulleys and this puts the vehicle in reverse drive. While not represented in the drawing, it is desirable to provide two belt-guiding rollers, one at each side of the pulley assembly, and which bear upon the sides of the belt to resist any tendency of the belt to belly outwardly as the two pulleys are moved directively toward one another, consequently preventing the belt from sticking in the V-groove. The sloping flanks 57 of the pulley 53 are or may be composed of Micarta whereas the V-grooves are or may in each instance be of metal.

It is believed that the described garden tractor and the manner of its operation will be clear from the foregoing. Various departures from the embodiment which I have here elected to illustrate may obviously be resorted to without departing from the spirit of the invention.

It is my intention that no limitations be implied by reason of having particularly described certain embodiments now preferred by me, and that the hereto annexed claims be read with the broadest scope commensurate with the language used.

What I claim is:

1. A garden tractor comprising, in combination: a vehicle frame presenting a plow-tail handle at its rear end, a gear box rigidly supported by the frame to lie at one end thereof, an engine supported by the frame to lie at the other end of the frame, driving connection from said engine to the gears of the gear box, a transverse live axle driven from the gears of the gear box and extending by its ends laterally beyond the frame, driver sprocket wheels upon said exposed axle ends, a transverse dead axle supported by the frame to lie intermediate the gear box and the engine and likewise extending by its ends laterally beyond the frame, idler sprocket wheels journaled on the exposed ends of said dead axle, and an endless crawler chain for each side of the tractor working about said driver and idler sprocket wheels.

2. A garden tractor comprising, in combination: a vehicle frame comprising parallel spaced side stringers and transverse bracing members rigidly interconnecting the stringers and with the stringers being each composed of bars of flat sheet steel placed on edge, said stringers presenting transversely aligned re-entrant openings cut into the stringers from the upper edge and located adjacent the rear end of the frame, a gear box hung between the frame stringers at said rear end of the frame and boltably interconnected with the latter, a transverse live axle driven from the gears contained in said box and received through said re-entrant openings to have the ends project laterally beyond the stringers, driver sprocket wheels upon said exposed axle ends, a transverse dead axle supported by the frame to lie in forwardly spaced relation from the live axle and likewise extending by its ends laterally beyond the stringers, idler sprocket wheels journaled on the exposed ends of said dead axle, an endless crawler chain for each side of the tractor working about said driver and idler sprocket wheels, and an engine having driving connection with the gears of the gear box and supported by the frame to occupy a position forwardly spaced from the dead axle.

3. The garden tractor of claim 2 in which the side stringers are longitudinally slotted to form ways guidably supporting the dead axle for limited horizontal movement, and an extension spring attached by one end to the axle and by its other end to the front end of the frame for yieldingly drawing the axle toward the frontal end of said slots for maintaining the crawler chains taut.

4. A garden tractor comprising, in combination: a vehicle frame presenting a plow-tail handle at its rear end, a gear box rigidly supported by the frame to occupy a position adjacent the rear end of the latter, a transverse live axle driven from the gears contained in said box and extending by its ends laterally beyond the frame, driver sprocket wheels upon said exposed axle ends, a transverse dead axle supported by the frame to lie in forwardly spaced relation from the live axle and likewise extending by its ends laterally beyond the frame, idler sprocket wheels journaled on the exposed ends of said dead axle, an endless crawler chain for each side of the tractor working about said driver and idler sprocket wheels, and an engine having driving connection with the gears of the gear box and supported by the frame in such forwardly spaced relation from the dead axle as to approximately counterbalance the dead weight of the gear box and place the tractor's center of weight in the immediate vicinity of the dead axle.

JAMES F. ATTWELL.

REFERENCES CITED

The following references are of record in the file of this patent:

UNITED STATES PATENTS

| Number | Name | Date |
|---|---|---|
| 828,713 | Coffman et al. | Aug. 14, 1906 |
| 1,398,382 | Lambert et al. | Nov. 29, 1921 |
| 1,804,470 | Knox | May 12, 1931 |
| 2,150,456 | Perrine | Mar. 14, 1939 |
| 2,457,821 | Johnson | Jan. 4, 1949 |

FOREIGN PATENTS

| Number | Country | Date |
|---|---|---|
| 847,233 | France | Oct. 5, 1939 |